July 29, 1969     M. J. MYLES ET AL     3,457,588
STUFFING APPARATUS

Filed Dec. 5, 1966

INVENTORS
MICHAEL J. MYLES
VYTAUTAS KUPCIKEVICIUS
BY JOHN H. BECKMAN
ATTORNEY

INVENTORS
MICHAEL J. MYLES
VYTAUTAS KUPCIKEVICIUS
BY JOHN H. BECKMAN
John F. Hohmann
ATTORNEY

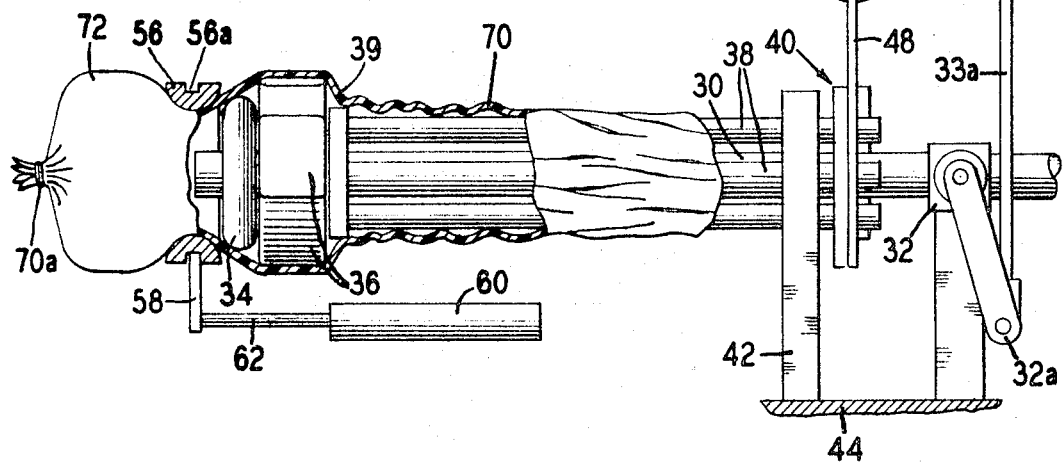
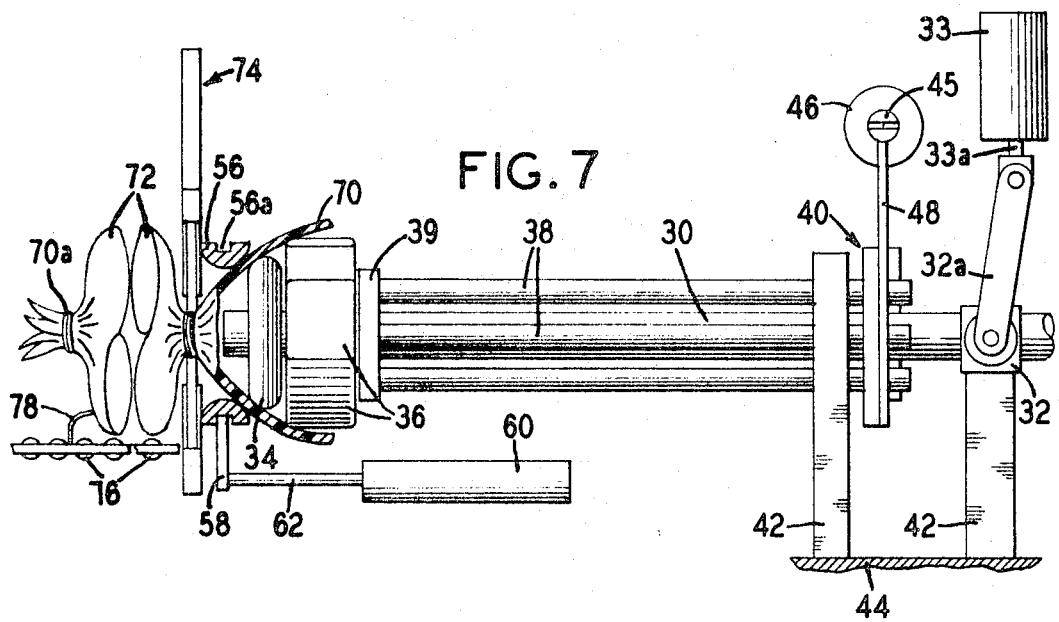

United States Patent Office 3,457,588
Patented July 29, 1969

3,457,588
STUFFING APPARATUS
Michael J. Myles, Downers Grove, Vytautas Kupcikevicius, Chicago, and John H. Beckman, Western Springs, Ill., assignors to Union Carbide Corporation, a corporation of New York
Filed Dec. 5, 1966, Ser. No. 599,271
Int. Cl. A22c 11/02, 11/00
U.S. Cl. 17—41                                    6 Claims

ABSTRACT OF THE DISCLOSURE

This disclosure sets forth an apparatus having means to pre-size a food casing before it is stuffed with a food emulsion.

---

The present invention relates to an apparatus and method for automatically filling food casings with food emulsions. More particularly, the present invention relates to an apparatus and method for automatically pre-sizing said food casings immediately prior to stuffing said food casings with a food emulsion.

The term "food casing," as used throughout this specification and in the appended claims, should be understood to include and is intended to refer to those food casings commonly termed "large food casings" which are conventionally employed by those skilled in the art to commercially produce food products such as salami and bologna sausages, spiced meat loaves, cooked and smoked ham butts and the like.

In accordance with present, commercial practices, these food casings are manufactured in tubular form by extrusion and are further processed in drying equipment wherein they are diametrically sized to comply with commercially acceptable tolerances. Subsequently, the dried food casings are flattened and wound up on reels from which specific lengths are later cut to fulfill the needs and requirements of various meat packers to whom they are supplied. An example of the methods commercially employed to provide food casings in this manner is set forth in the U.S. patent to Hewitt (1,967,773).

Generally, large food casings are manufactured in flat widths which can range in size from between about 2" to 15" with the median range of flat widths measuring from between about 3" to 8". The food casings in the median range of flat widths are the ones which are generally and more commonly utilized by commercial meat packers from which sliced, unit food packages of predetermined weight are obtained. After cooking and/or curing the food item encased therein, in accordance with conventional manufacturing processes, many of the food products obtained are sliced and packaged into units of predetermined weight for sale to the consumer. The slicing equipment employed in such packaging operations are pre-set to yield a specific weight-by-slice count for use in obtaining unit packages of equal weight. It is important, therefore, that the diameter and incremental volume of a stuffed and encased food product processed in a food casing of a particular size be uniform from end to end and from one encased food product to the next.

As the food items encased in these food casings are cooked and/or cured, the food casings act as molds or containers so that the thusly processed food product obtained will exhibit dimensional uniformity. Generally, a food item is stuffed in a food casing under pressure in the form of an emulsion or an emulsion having discrete particles therein. Hence, the food casing must be capable of maintaining the food item stuffed therein in a desired or required shape during processing so that the food item can coagulate, cure or firm up as it is cooked and/or cured. During processing, the stuffed food items usually shrink and it is important that the food casing also be capable of shrinking proportionately with the food item so that the food products obtained exhibit desired or required surface texture and are dimensionally uniform from end to end and from one food product to the next.

Prior to stuffing, these large food casings are typically prepared for stuffing by closing one end thereof and then soaking the thusly closed food casings in water maintained at a temperature of from between about 100° F. to 120° F. for a period of between about 20–30 minutes. This preparation acts to soften the food casings and thereby increase their pliability and enhance their workability. After the food casings have been properly prepared, they are individually sheathed on a conventional stuffing tube which is connected, by means of a manually controlled valve, to a food emulsion source. A typical method employed to stuff large food casings with a food emulsion is described in the U.S. patents to Shiner and Brounstein (2,999,756) and Cieri (3,091,799).

The methods and apparatus heretofore employed to stuff these large food casings have generally relied upon the manual manipulations of the operator in controlling the stuffing of the food emulsion in the food casing. Since such factors as the manual skill, the fatigue level and physical dexterity of an operator vary from one stuffing operation to another as well as between different operators, encased food products are obtained whose dimensions and incremental volumes vary significantly from end to end and from one encased food product to the next. These variations become evident when these encased food products are subsequently sliced for packaging giving rise to underweight or overweight packages that are excessively costly and, therefore, not acceptable to the food packager.

Exemplary of the methods generally employed to stuff large food casings is one wherein the operator regulates the flow of food emulsion by manipulating a stuffing valve with one hand while restraining the expanding food casing in its progressive removal from the stuffing tube by gripping it with the other hand until the casing is filled from end to end. Stuffing pressure is maintained in the casing by the gripping hand of the operator and the last filled end is closed by conventional clip closing means or tying apparatus.

This and similar stuffing methods make it extremely difficult for an operator to apply a constant and uniform hold-back restraining force during the stuffing of successive food casings. When higher stuffing speeds are used, the result of operator inefficiency becomes even more pronounced and is reflected in the varying dimensions of the encased products obtained.

Since the encased food products obtained from these stuffing methods are generally not dimensionally uniform, a great deal of product waste is experienced by the food packager who subsequently slices the finished food products for packaging in unit packages of predetermined, uniform weight.

It is an object of the present invention, therefore, to provide a stuffing apparatus which is capable of automatically pre-sizing a large food casing immediately prior to stuffing said food casing with a food emulsion.

Another object is to provide an apparatus which will automatically produce encased food products having a substantially uniform incremental volume and uniform dimensions from end to end and from a given product piece to a given product piece and a method therefor.

These and other objects of the present invention will become more apparent from the following discussion.

It has now been found that dimensional uniformity of these encased food products can be substantially improved by pre-sizing the food casing immediately prior to stuffing said food casing with a food emulsion and progressively expanding the food casing as it is being stuffed.

The objects of the present invention can be generally obtained by providing, in combination, a stuffing tube equipped with a conventional stuffing valve at one end and having means at the other end for automatically expanding and pre-sizing a food casing up to a predetermined peripheral dimension; means for simultaneously applying a constant restraining force to said food casing as it is being stuffed; means for supporting the thusly stuffed food casing; and means for automatically shutting off the flow of food emulsion into said food casing after said food casing has been completely stuffed.

In the apparatus of the present invention, a pre-sizing means is employed. The pre-sizing means comprises a plurality of sizing elements which are circumferentially disposed about the stuffing tube adjacent its outlet end. By means of a linkage assembly, the sizing elements can be radially displaced relative to the stuffing tube to contact the inner surface of a food casing positioned on the stuffing tube and circumferentially expand the food casing up to a predetermined size. The preferred configuration of the sizing elements and the manner in which they are radially displaced are such that they define a predetermined substantially circular shape so that a food casing positioned on the stuffing tube can be uniformly and simultaneously expanded about its circumference up to the diameter desired or required.

It should be understood, however, that by altering the size and/or configuration of the sizing elements that the food casing can be expanded to assume a variety of shapes, such as oval, rectangular, square, polygonal and the like.

The apparatus and method of the present invention will become apparent from the following description thereof when considered together with the accompanying drawing which is set forth as being exemplary of one embodiment of the present invention and is not intended, in any way, to be limitative thereof and wherein;

FIGS. 4–7 are side elevational views, part in section and part in phantom, of the apparatus of FIG. 1 illustrating sequential operating positions of the various components of the apparatus;

Figure 1:
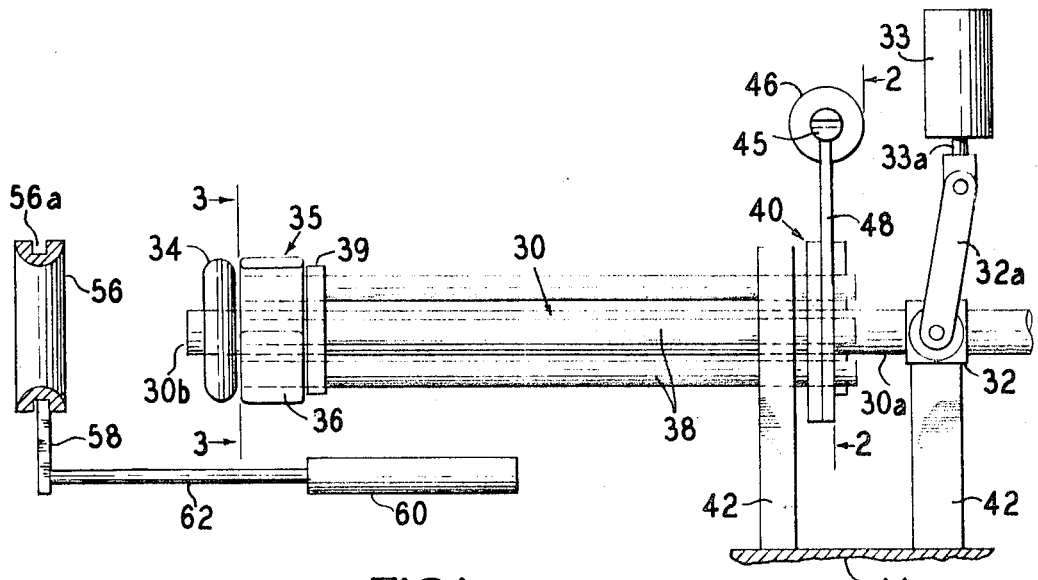
FIG. 1 is a side elevational view, part in section and part in phantom, of one embodiment of the apparatus of the present invention.

Turning now to the drawing, wherein like reference numerals denote like parts, there is shown in FIG. 1 a stuffing tube generally designated by reference numeral 30 having an inlet end 30a and an outlet end 30b. A stuffing valve is generally indicated by reference numeral 32 and is connected to the stuffing tube 30 at its inlet end 30a. The stuffing valve 32 is operated and controlled by means of a pneumatic cylinder 33 which is connected through its piston rod 33a to the stuffing valve 32 by means of a linkage 32a.

Mounted adjacent the outlet end 30b of stuffing tube 30 is a tubular collar 34. The outside circumference of tubular collar 34 is fabricated to be convex and have a diameter no greater than the inside diameter of a food casing to be stuffed.

A preferred embodiment of the pre-sizing means of the apparatus of the present invention is generally designated by reference numeral 35. The pre-sizing means comprises a plurality of sizing elements 36 which are positioned adjacent tubular collar 34. Each of the sizing elements 36 are fixedly mounted to their own connecting shafts 38. Connecting shafts 38 are guided through a guide collar 39 so that they are horizontally disposed about stuffing tube 30 and extend rearwardly from the sizing elements 36 to a control linkage assembly generally designated by reference numeral 40. Control linkage assembly 40 can be positioned at any point intermediate the pre-sizing means 35 and the inlet end 30a of stuffing tube 30 but is preferably positioned adjacent the stuffing valve 32. Stuffing valve 32 as well as control linkage assembly 40 can each be supported in their relative positions by means of conventional brackets 42 mounted upon a support frame generally designated by reference numeral 44.

An emulsion stoppering ring 56 is mounted and positioned adjacent the outlet end 30b of stuffing tube 30. Stoppering ring 56 has an annular groove 56a defined in its outer circumference and is loosely mounted and slideably secured to one end of a yoke 58 by means of its annular groove 56a. Mounted in this way, stoppering ring 56 is capable of axial and radial movement with respect to the yoke 58. Stoppering ring 56 is fabricated to have a convex inner circumference and an inside diameter less than the outside diameter of a food casing to be stuffed. During operation, emulsion stoppering ring 56 is positioned such that its diameter and toroidal radius are capable of co-acting with the outer circumference of tubular collar 34 when positioned adjacent thereto. To accomplish this co-action between stoppering ring 56 and tubular collar 34, the stoppering ring 56 is positioned in a spaced-apart relationship adjacent tubular collar 34. The other end of yoke 58 is fixedly secured to the free end of a piston rod 62 of a pneumatic cylinder 60. Pneumatic cylinder 60 and its piston rod 62 provide the means by which stoppering ring 56 is positioned in spaced-apart relationship adjacent tubular collar 34.

Figure 2:
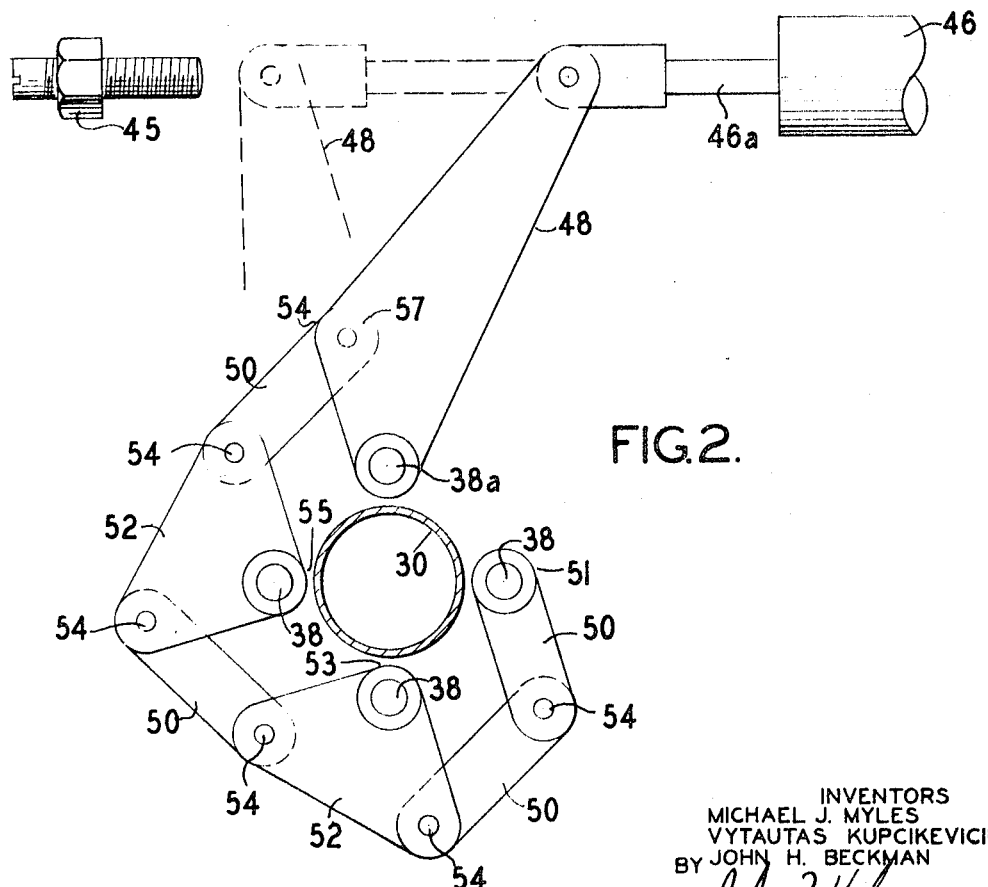
FIG. 2 is an end elevational view thereof, part in phantom, taken through line 2—2 of FIG. 1.

In FIG. 2 there is shown the component elements of the control linkage assembly 40. Control linkage assembly 40 comprises a plurality of linkage arms 50 each of which are pivotally connected by means of conventional pins 54, to interconnecting toggle links 42. In the arrangement shown, one linkage arm 50 is fixedly secured to the other end of a shaft 38 at 51 while toggle links 52 are similarly secured to two other shafts 38 at 53 and 55.

A master connecting toggle link 48 is securely connected to the remaining connecting shaft, designated in this embodiment by reference numeral 38a, and pivotally secured to one connecting link 50 at 57. The drive means for the control linkage assembly 40 is provided by a pneumatic cylinder 46 whose piston rod 46a is pivotally connected to master connecting toggle link 48. The extent to which master connecting toggle link 48 can be advanced can be readily controlled and regulated by means of an adjustable stop 45 mounted adjacent thereto.

Figure 3:
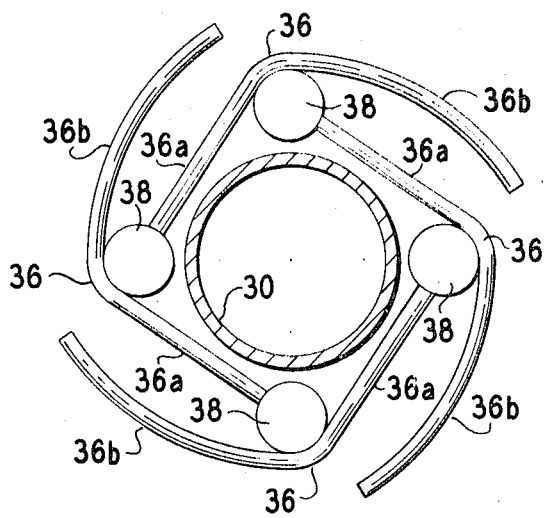
FIG. 3 is an end elevational view thereof taken through line 3—3 of FIG. 1 and showing the sizing elements in closed position.
Figure 3A:
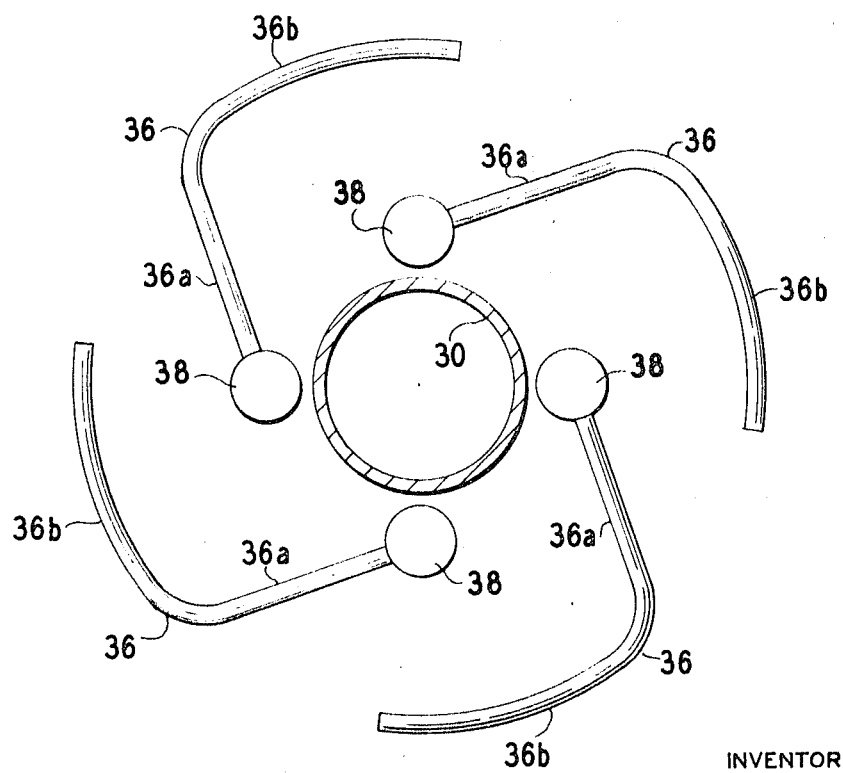
FIG. 3a is a view similar to FIG. 3 but with the sizing elements opened to operating position.

Turning now to FIG. 3, there is shown the sizing elements 36 disposed about the stuffing tube 30. As can be seen more clearly in FIG. 3a, each of the sizing elements 36 is fabricated in the form of a cammed arm and is connected at the end of its leg 36a to its respective shaft 38. The arcuate portions 36b of the sizing elements 36 are fabricated to be disposed at an angle of about 90° with respect to legs 36a. When a non-operating position, as shown in FIG. 3, the arcuate portions 36b of the sizing elements 36 are disposed in overlapping relationship with respect to the leg 36a of the next, successive sizing element 36. When opened to an operating position, as shown in FIG. 3a, the arcuate portions 36b of the sizing elements 36, described a substantially circular shape which proscribes a plane transverse to the longitudinal axis of the stuffing tube 30. In the embodiment illustrated in FIG. 3a, this circular shape is not continuous. However, the sizing elements 36 can be fabricated such that they can describe a substantially continuous circular shape or, as pointed out hereinabove, describe a variety of shapes without detracting from their intended function; namely, to expand a food casing up to a predetermined peripheral dimension prior to stuffing.

Figure 4:
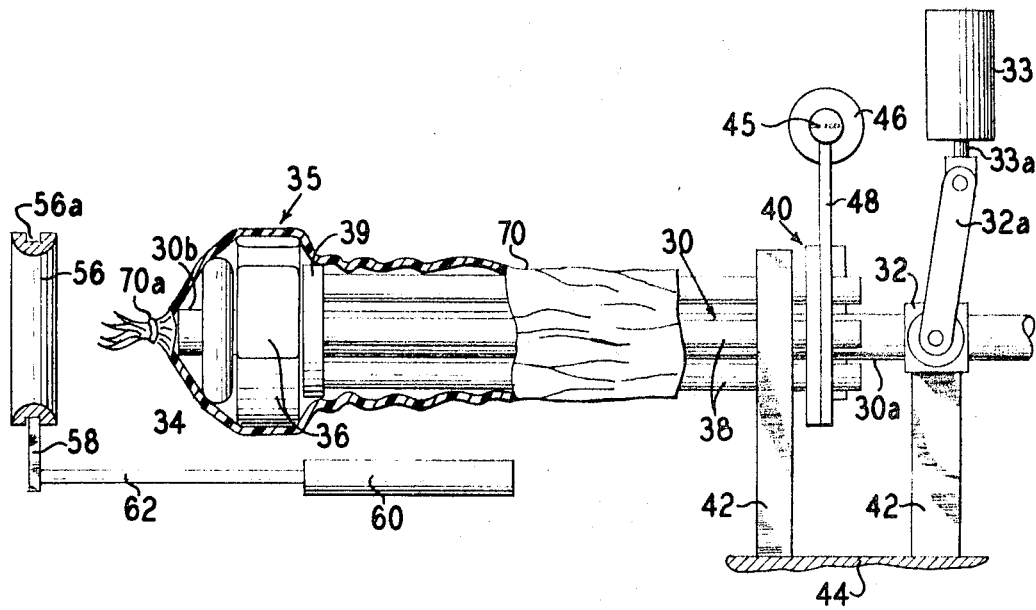

In FIG. 4, there is shown a large food casing 70 having a closed end 70a and disposed about the stuffing tube 30 with the sizing elements 36 extended to operating position.

Figure 5:
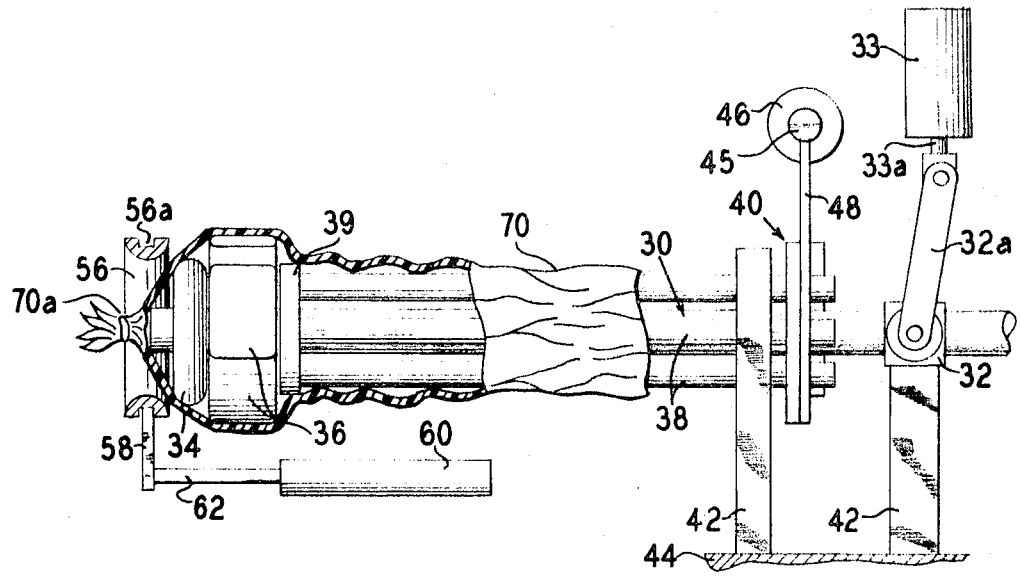

FIG. 5 illustrates the positioning of the emulsion stoppering ring 56 in spaced-apart relationship adjacent the tubular collar 34 at the outlet end of the stuffing tube 30. As can be seen, the closed end 70a of the food casing extends through the aperture of the thusly positioned stoppering ring 56a.

In FIG. 6, there is illustrated the positioning of the various components of the apparatus as the food casing 70 is being stuffed with a food emulsion, the stuffed portion of the food casing being designated by reference numeral 72.

In FIG. 7, the disposition of the various components of the apparatus are illustrated after a food casing 70 has been completely stuffed with a food emulsion 72. As seen in FIG. 7, a commercial clip closing apparatus, generally designated by reference numeral 74, is positioned adjacent the outlet end of the stuffing tube 30 to provide the means by which a second closure can be made in the stuffed food casing 70.

In FIG. 7, there is also shown a conventional roller type conveyor means, generally designated by reference numeral 76, which can be positioned adjacent the clip closure means 74 to provide the means by which the stuffed and closed food casing is supported and conveyed away from the stuffing apparatus. Mounted to and positioned intermediate the ends of the roller conveyor 76 there is a switch 78. Switch 78 is conveniently mounted to the roller conveyor 76 by means of a conventional clamp (not shown) and is positioned to intercept and be thusly activated by the stuffed food casing 72 as it is transported on roller conveyor 76. Switch 78 can, in turn, be connected to another switch controlling the stuffing valve 32. In this way, activation of switch 78 can provide the means to automatically shut off the flow of the food emulsion through the stuffing valve 32.

Figure 8:
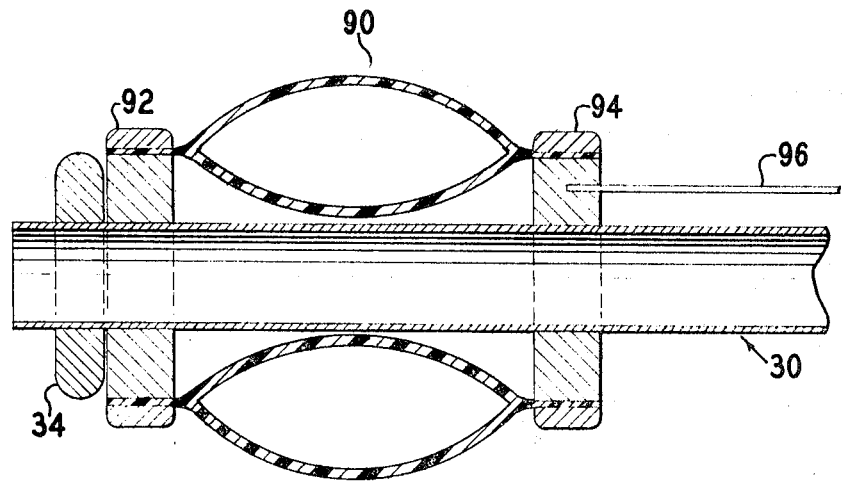
FIG. 8 is a side elevational view, part in section and part broken away, illustrating another embodiment of the apparatus of the present invention.
Figure 8A:
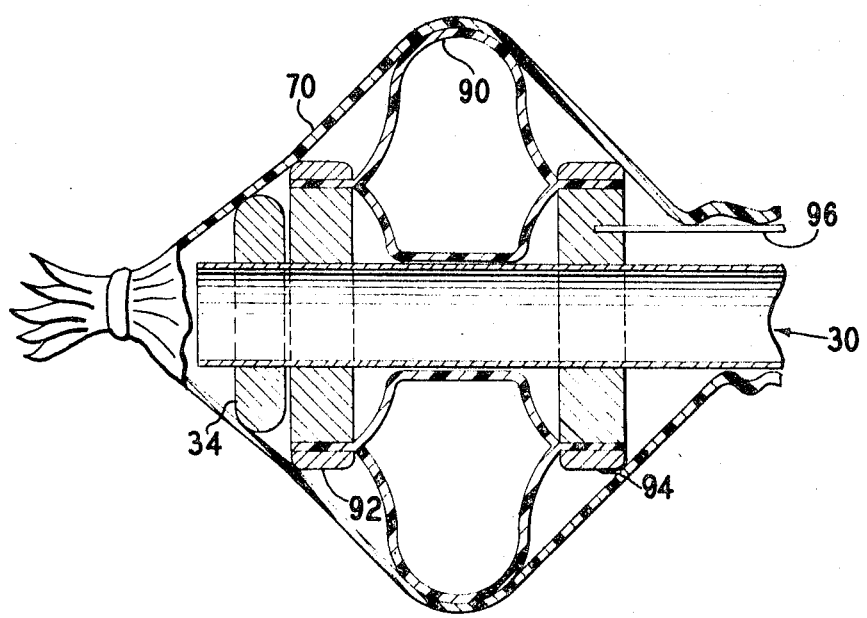
FIG. 8a is a side elevational view illustrating the apparatus of FIG. 8 in operating position.

In FIG. 8, there is illustrated another embodiment of the sizing apparatus of the present invention. In this embodiment there is provided an endless tubular sleeve 90, which can be fabricated from any suitable, non-porous, impervious material, such as rubber. In cross section, tubular sleeve 90 is elliptically shaped providing a pair of lateral side edges. One side edge of the tubular sleeve 90 is secured in a bracket 92 which, in turn, is fixedly mounted to the stuffing tube 30 adjacent tubular collar 34. The other side edge of tubular sleeve 90 is secured in a second bracket 94 which is slidably mounted on stuffing tube 30. Slidably mounted bracket 94 is reciprocated along stuffing tube 30 by means of a suitable connecting arm 96 which can be energized by conventional drive means. Tubular sleeve 90 can be filled with a fluid medium, such as oil or air, so that when slidably mounted bracket 94 is advanced toward tubular collar 34 by means of connecting rod 96, the fluid medium in tubular sleeve 90 assumes the distorted shape of tubular sleeve 90 as it is deformed between brackets 92 and 94 as shown in FIG. 8a. The extent of deformity of tubular sleeve 90 will be governed by the extent to which the food casing is to be expanded to a predetermined peripheral dimension.

A typical operation of the preferred embodiment of the apparatus of the present invention will now be described and will be more readily understood when considered together with FIGS. 1–7 of the drawing.

Prior to startup, a food casing 70 having a pre-tied closed end 70a, is placed over and sheathed about the stuffing tube 30 until the pre-tied closed end 70a is abutted tightly against the outlet end 30b of the stuffing tube 30 (FIG. 4). The remainder of the food casing 70 is then loosely gathered about and disposed along the stuffing tube 30 toward the control linkage 40. Next, pneumatic cylinder 46 is activated to rotate master toggle link 48 through a predetermined arc by means of piston rod 46a as shown in phantom in FIG. 2. Rotation of master toggle link 48 acting on connecting shaft 38a results in rotation of all of the connecting shafts 38 through means of interconnecting toggle links 52 and linkage arms 50. Rotation of the connecting shafts 38 also results in simultaneous rotation of the sizing elements 36 from their closed position as shown in FIG. 3 to their open and operating position as shown in FIG. 3a. The peripheral dimension of the circular shape thus defined by the opened sizing elements 36 can be readily altered as required or desired by means of the adjustable stop 45 to control and regulate the stroke of piston rod 46a to predetermineed limits. This in turn, will govern the extent of the arc through which master connecting toggle link 48 will be advanced. The extent to which the sizing elments 36 are opened to pre-size the food casing will be governed by the predetermined diameter to which the particular sized food casing is to be stuffed.

The emulsion stoppering ring 56 is now positioned in spaced-apart relationship adjacent the tubular collar 34 at the outlet end of the stuffing tube by means of yoke 58, piston rod 62, and pneumatic cylinder 60. The pre-tied closed end 70a of food casing 70 is thusly indented and gathered, and the wall and the folds and creases of the food casing 70 are narrowed down and about the curved outer surface of tubular collar 34 and about the toroidal inside diameter of the emulsion stoppering ring 56.

As pointed out hereinabove, the sizing elements 36 act to "pre-size" the food casing; that is, the sizing elements 36 are simultaneously and uniformly radially expanded from their closed position relative to the stuffing tube 30 until they contact and circumferentially expand the food casing up to the predetermined diameter to which the food casing is to be stuffed as shown in FIGS. 4 and 5. In a preferred embodiment of the present invention, the sizing elements 36, in their extended position, define a substantially circular shape that is generally concentric to the circumference of the stuffing tube 30. When extended in this manner, the sizing elements 36 are caused to engage the inside wall of the food casing 70 and expand it to its predetermined diameter. The food casing is now ready to be stuffed with a food emulsion.

Food emulsion is then admitted to the inlet end 30a of stuffing tube 30 upon actuation of pneumatic cylinder 33. Pneumatic cylinder 33, acting through its piston rod 33a, rotates connecting link 32a thereby opening the stuffing valve 32. As food emulsion enters the food casing 30 and contacts the pre-tied closed end 70a of the food casing 70, the sizing elements 36, acting in frictional engagement with the internal wall of food casing 70, act to retard and restrain the advance of the pre-tied closed end of the food casing 70. This retarding effect is sustained until the food emulsion entering the food casing 70 builds up sufficient pressure, acting horizontally on the closed end 70a of the food casing, to overcome the frictional forces exerted by the sizing elements 36 at their points of contact with the inside wall of the food casing 70. When the horizontal force created by the filling pressure of the food emulsion becomes greater than these opposing frictional forces, the closed end 70a of the food casing 70 will begin to advance horizontally freely sliding over tubular collar and through stoppering ring 56 as shown in FIG. 6.

As the stuffed portion of the food casing 70 is progressively withdrawn, each unstuffed portion of the food casing is progressively pre-sized immediately prior to being stuffed, the pre-sizing being accomplished by the engagement of the unstuffed portion of the food casing with the sizing elements 36 in the same manner as is described immediately hereinabove.

During the stuffing of the food casing 70, the stoppering ring 56 is urged away from the tubular collar 34 in the direction of flow of the filled portion of the food casing 70 to the extent permitted by the configuration of its annular groove 56a mounted in yoke 58 as shown in FIG. 6.

As illustrated in FIG. 7, the stuffed portion of the food casing 72 is advanced from the stoppering ring 56 and is carried on and supported by a roller conveyor means 76. Stuffing of the food casing in this manner continues until the stuffed, pre-tied end of the food casing contacts switch 78. Positioning of switch 78 on roller conveyor 76 will depend upon the length of the food casing to be stuffed and can be readily adjusted according thereto. As previously described, activation of switch 78, in turn, activates a second switch (not shown) controlling pneumatic cylinder 33. Upon activation of switch 78, therefor, link 32a is again rotated to close the stuffing valve 32 by means of pneumatic cylinder 33 acting through its piston rod 33a, thereby shutting off the flow of food emulsion. When the flow of food emulsion is terminated, emulsion stoppering ring 56 is urged toward tubular ring 34 through the pressures exerted by the stuffed food emulsion in the food casing 70 adjacent thereto as shown in FIG. 7. Sufficient pressure is exerted on stoppering ring 56 at this point to urge the outer surface of its toroidal diameter against the outer circumference of tubular ring 34 thereby clamping therebetween the wall of the food casing 70 passing therethrough. In this manner, food emulsion is prevented from backing up onto the outer surface of the stuffing tube 30 once the flow of food emulsion has been stopped.

The completely stuffed food casing 70 is now ready to be closed and any means known to those skilled in the art can be used to provide a second closure in the stuffed food casing. Conveniently, however, a conventional clip tying apparatus 74 (FIG. 7) can be positioned adjacent the outlet end of the stuffing tube 30 as described hereinabove, and means can be provided so that it is activated to automatically secure a second closure in the stuffed food casing as soon as the flow of food emulsion has ceased.

Once completely closed the stuffed food casing is transported away from the stuffing apparatus and the emulsion stoppering ring 56 and sizing elements 36 are returned to their respective starting positions by means of pneumatic cylinder 60 and pneumatic cylinder 46 respectively.

As has been described hereinabove, the sizing elements 36 of the pre-sizing means 35 are positioned adjacent tubular collar 34. For optimum results, the sizing elements 36 should be positioned as close to the outlet end of stuffing tube 30 as possible so that circumferential expansion of and engagement with the food casing by the sizing elements 36 can be accomplished as close to the outlet end of the stuffing tube 30 as is feasible. As is well known to those skilled in the art, the inherent characteristics of large food casings are such that they have a definite tendency to return to their initial dimension after having been expanded. Hence, by positioning the sizing elements 36 as close as possible to the outlet end of the stuffing tube 30, the food casing will be stuffed with food emulsion before the food casing has an opportunity to exhibit its tendency to return to its initial dimension. Positioning of the sizing elements in this manner and pre-positioning the closed end of the food casing before it is stuffed, as described hereinabove, together act to insure that substantially uniform expansion of the food casing up to its pre-determined diameter can be achieved throughout the length of the food casing as the food casing is progressively stuffed with a food emulsion.

Although the foregoing has been set forth with regard to the preferred embodiment of the apparatus of this invention, the same would also apply to the other embodiment disclosed herein.

It will be readily appreciated by those skilled in the art that the construction of the apparatus of the present invention does not require the use of a stuffing tube having a length substantially equal to that of a food casing to be stuffed. By utilizing the apparatus of the present invention, shorter stuffing tubes than those presently in commercial use can be employed to accommodate large food casings of any length.

Although the means described herein to energize and drive the various components of the apparatus of the present invention have been described as pneumatic means, it should be understood that other well known means, such as mechanical, hydraulic, electrical and the like or combinations thereof, can also be similarly employed.

While the present invention has been set forth in some detail and described with particularity, it should be understood that changes, modifications and alterations can be made therein without departing from the scope and spirit of the invention.

What is claimed is:

1. An apparatus for automatically stuffing large food casings with a food emulsion comprising, in combination:
   (a) a stuffing tube having an inlet end and an outlet end, the inlet end being connected through a stuffing valve to a source of food emulsion; and
   (b) a pre-sizing means comprising a plurality of arcuate elements concentrically disposed about the outer circumference of the stuffing tube proscribing a plane transverse to the longitudinal axis of the stuffing tube and mounted adjacent the outlet end of the stuffing tube, said pre-sizing means being capable of simultaneously and uniformly internally expanding a food casing to a predetermined peripheral dimension before said food casing is stuffed with a food emulsion.

2. The apparatus of claim 1 which includes, in combination:
   (a) a tubular collar mounted adjacent the outlet end of said stuffing tube, said tubular collar having an outside diameter no greater than the inside diameter of a food casing to be stuffed;
   (b) means for automatically shutting off the flow of food emulsion after a food casing has been stuffed;
   (c) means including an emulsion stoppering ring, the inside diameter of which is less than the outside diameter of a food casing to be stuffed, said stoppering ring being mounted and positioned in spaced-apart relationship with respect to said tubular collar;
   (d) means for automatically closing the last stuffed end of a food casing; and,
   (e) means for supporting and conveying a completely stuffed and closed food casing from said stuffing tube.

3. The apparatus of claim 1 wherein said pre-sizing means comprises, in combination:
   (a) a plurality of sizing elements each having arcuate portions and leg portions, the arcuate portions thereof being circumferentially disposed about said stuffing tube adjacent the outlet end of said stuffing tube;
   (b) a plurality of horizontally disposed connecting shafts each of which is fixedly secured at one end to the leg portion of each of said sizing elements;
   (c) a linkage assembly comprising a plurality of linkage arms and toggle links fixedly secured to the other end of said shafts and pivotally secured to each other; and
   (d) means for rotating said shafts by means of said linkage assembly such that the arcuate portions of said sizing elements are simultaneously and uniformly radially displaced with respect to said stuffing tube to define a predetermined shape.

4. The apparatus of claim 1 wherein said pre-sizing means comprises, in combination:
   (a) an endless, elliptically shaped sleeve containing a fluid medium circumferentially disposed about said stuffing tube adjacent its outlet end;
   (b) means for fixedly securing one lateral side edge of said sleeve;
   (c) means slidably mounted on said stuffing tube to which the other lateral side edge of said sleeve is secured; and,
   (d) means for reciprocating said slidably mounted means toward and away from the outlet end of said stuffing tube such that the configuration of said sleeve is altered to define a predetermined peripheral dimension about said stuffing tube.

5. An apparatus for automatically stuffing large food casings with a food emulsion comprising, in combination:
   (a) a stuffing tube whose inlet end is connected through a stuffing valve to a source of food emulsion;
   (b) a tubular collar mounted adjacent the outlet end of said stuffing tube, said tubular collar having an outside diameter no greater than the inside diameter of a food casing to be stuffed;
   (c) a pre-sizing means mounted adjacent said tubular collar, said pre-sizing means comprising a plurality of sizing elements each having arcuate portions and leg portions, the arcuate portions thereof being circumferentially disposed about said stuffing tube at a point adjacent said tubular collar; a plurality of horizontally disposed connecting shafts each of which is fixedly secured at one end to the leg portion of each of said sizing elements; a linkage assembly fixedly secured at one end to the other end of said shafts and pivotally secured to each other; and means for rotating said shafts by means of said linkage assembly such that the arcuate portions of said sizing elements are simultaneously and uniformly radially displaced with respect to said stuffing tube to define a predetermined substantially circular shape which is generally concentric to the circumference of said stuffing tube and which is capable of circumferentially expanding a food casing up to a predetermined diameter before said food casing is stuffed with a food emulsion;
   (d) means including an emulsion stoppering ring the inside diameter of which is less than the outside diameter of a food casing to be stuffed, said stoppering ring being reciprocally mounted and positioned in spaced-apart relationship with respect to said tubular collar;
   (e) means for automatically shutting off the flow of food emulsion after a food casing has been stuffed;
   (f) means for automatically closing the last stuffed end of a food casing after it has been stuffed; and,
   (g) means for supporting and conveying a completely stuffed and closed food casing away from said stuffing tube.

6. The apparatus of claim 5 wherein said pre-sizing means comprises, in combination:
   (a) an endless, elliptically shaped sleeve containing a fluid medium circumferentially disposed about said stuffing tube adjacent its outlet end;
   (b) means for fixedly securing one lateral side edge of said sleeve.
   (c) means slidably mounted on said stuffing tube to which the other lateral side edge of said sleeve is secured; and,
   (d) means for reciprocating said slidably mounted means toward and away from the outlet end of said stuffing tube such that the configuration of said sleeve is altered to define a predetermined peripheral dimension about said stuffing tube.

References Cited
UNITED STATES PATENTS

| | | | |
|---|---|---|---|
| 1,043,241 | 11/1912 | Louden | 17—41 |
| 2,168,693 | 8/1939 | Walter | 17—33 |
| 2,871,508 | 2/1959 | Hill | 17—41 |
| 3,264,679 | 8/1966 | Moekle | 17—33 |

LUCIE H. LAUDENSLAGER, Primary Examiner

U.S. Cl. X.R.

17—33, 35